Oct. 19, 1965  W. A. GROSS  3,212,829
FLUID FILM BEARING
Filed Feb. 11, 1963  2 Sheets-Sheet 1
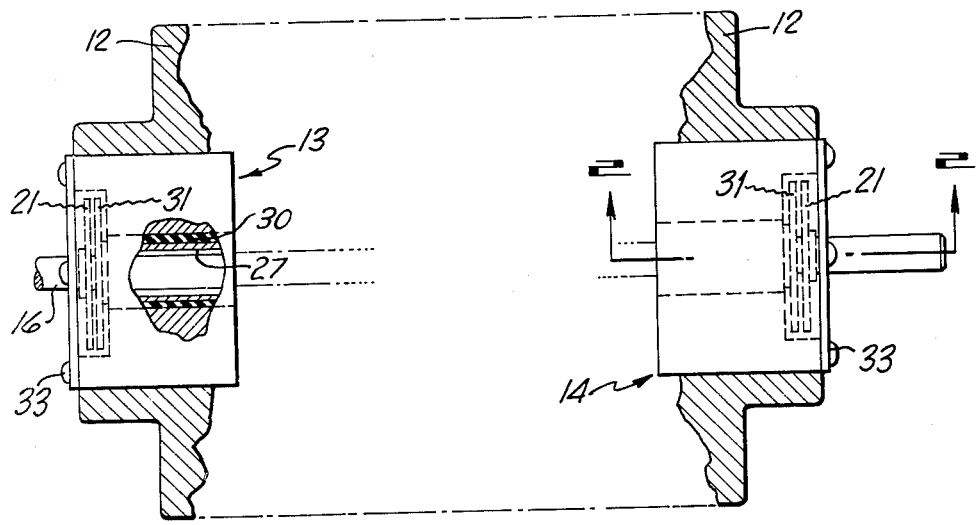
FIG_1
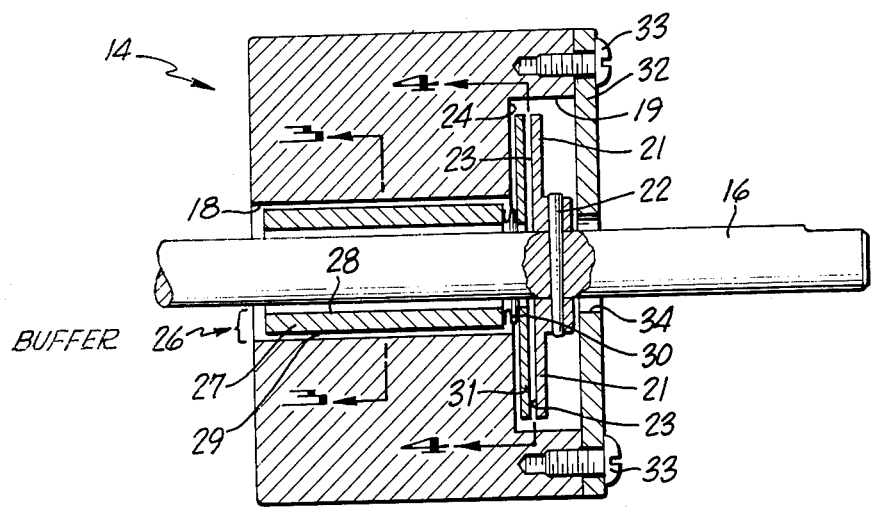
FIG_2
WILLIAM A. GROSS
INVENTOR.
BY Robert D. Clay
ATTORNEY Oct. 19, 1965  W. A. GROSS  3,212,829
FLUID FILM BEARING
Filed Feb. 11, 1963  2 Sheets-Sheet 2
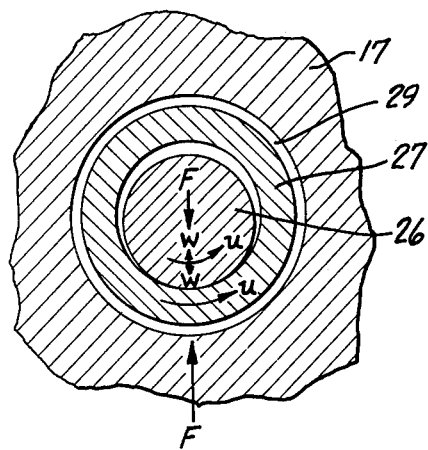
FIG_3
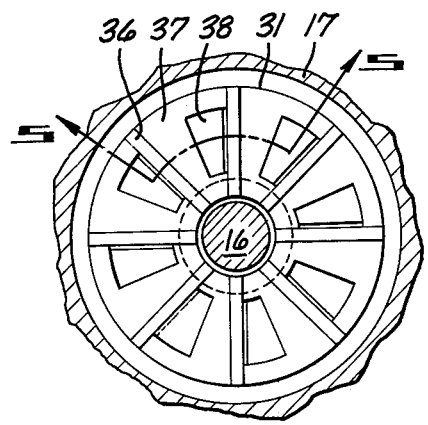
FIG_4
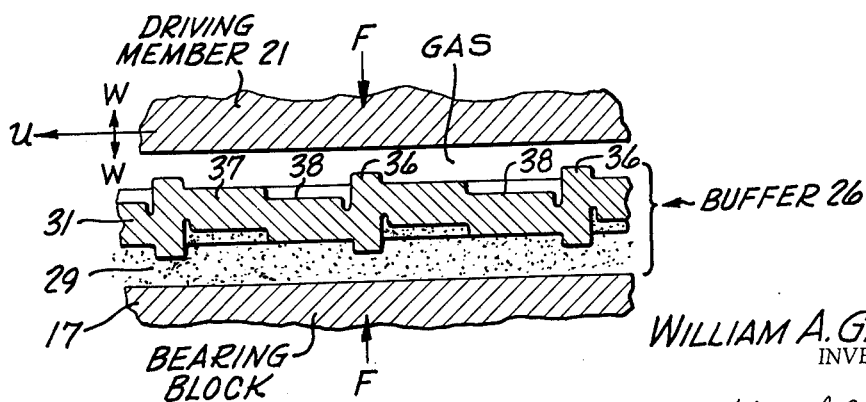
FIG_5
WILLIAM A. GROSS
INVENTOR.
BY Robert S. Clay
ATTORNEY 3,212,829
FLUID FILM BEARING
William A. Gross, Los Altos Hills, Calif., assignor to Ampex Corporation, Redwood City, Calif., a corporation of California
Filed Feb. 11, 1963, Ser. No. 257,467
18 Claims. (Cl. 308—5)

This invention relates to fluid bearings, and particularly to such bearings adapted for easy initiation of operation.

Fluid bearings are often used for reduction of friction between moving parts, as for example one element moving linearly with respect to another, or a shaft rotating with respect to a journal block. A fluid is disposed between the parts and the motion of the parts causes a pressure to build up in the fluid that supports the normal load, and forms a substantially frictionless cushion between the parts. It is true that the viscosity of the fluid itself creates a drag opposing the relative movement of the parts, but such a drag is considerably less than the frictional drag that would otherwise obtain. When the fluid is a gas, such as air, the viscous drag is minimal, and very high speeds can be attained.

In fluid (e.g., air) journal bearing, the shaft when motionless usually rests directly on a subtending portion of the journal block opening. When the shaft is rotated, it initially rubs frictionally on this portion of the block, and it is not until considerable velocity of rotation has been reached that the fluid forms the frictionless cushion desired. The initial frictional rubbing causes wear and eventual destruction of both shaft and journal.

Even when the fluid cushion is properly formed, the shaft under some conditions may exhibit self-excited whirl, during which the shaft may strike the journal block with a severe impact, causing catastrophic failure of the shaft and journal.

When the shaft is supported on two or more spaced bearings, the problem of aligning the journals to avoid contact with the shaft becomes more difficult as the clearances are reduced, as for the purpose of obtaining more accurate operation of the shaft.

Accordingly, it is an object of the present invention to provide a fluid bearing adapted for easy and substantially frictionless initiation of operation.

It is another object of the present invention to provide a fluid bearing adapted to inhibit the self-excited whirl of the shaft.

It is a further object of the invention to provide a fluid bearing adapted to absorb energy of impact from a rotating shaft and to prevent catastrophic failure thereof.

It is a still further object of the invention to provide a fluid bearing adapted for automatic self-correction of the misalignment of a shaft.

A bearing constructed in accordance with the invention includes a buffer mounted between a shaft and a bearing block, the buffer being yieldable in a radial direction to absorb the energy of radial impact of the shaft. The buffer is also rotatable by the shaft during starting so that the shaft undergoes no frictional wear. In one form the buffer includes a hollow cylindrical sleeve loosely fitted between the shaft and bearing block and concentric with the shaft, the space between the sleeve and shaft being filled with air, and the space between the sleeve and bearing block being filled with grease (the reverse is also possible). On starting, the shaft, in frictional contact with the sleeve, causes the sleeve to rotate. Shear occurs within the grease due to slippage between the sleeve and the bearing block, but substantially no slippage occurs between the shaft and sleeve. When the rotational velocity is great enough to cause air to be entrapped between the shaft and sleeve, the shaft becomes supported by an air cushion and the sleeve stops rotating. The grease then functions as a radially yieldable support for the sleeve, holding it in spaced relation to the bearing block. If the shaft suddenly engages the sleeve with an impact, the energy of collision is absorbed in the grease and no damage results. An analogous arrangement is adapted to perform as a thrust bearing.

A better understanding of the invention may be had by reference to the following description, taken in conjunction with the accompanying drawings in which:

FIGURE 1 is a broken away elevation of a motor fitted with the bearings of the invention;

FIGURE 2 is an enlarged section of a bearing taken along lines 2—2 of FIGURE 1;

FIGURE 3 is an enlarged cross-section taken along lines 3—3 of FIGURE 2;

FIGURE 4 is a cross-section taken along lines 4—4 of FIGURE 2; and

FIGURE 5 is a cross-section taken along lines 5—5 of FIGURE 4.

Referring now to the drawings and particularly to FIGURE 1, there is shown a motor 11 having a housing 12, in the ends of which are mounted bearings 13 and 14 for the shaft 16 of the motor. In FIGURE 2, the bearing 14 is shown as including a bearing block 17 having a bore 18 formed therethrough to define a bearing surface for the shaft 16. The bore 18 is counter-bored at one end to define a recess 19 of greater diameter for enclosing a flange member 21 which is concentrically mounted on the shaft 16 as by means of a pin 22. One side 23 of the flange member 21 faces toward and is substantially parallel to a wall 24 of the recess 19 so as to limit the axial movement of shaft 16 in at least one direction.

The above described features are common to most fluid bearings in which a fluid such as oil or air is disposed between the shaft and bearing block. Upon revolution of the shaft at sufficient speed, the fluid is driven into a pressurized cushion beneath the shaft, causing the shaft to be lifted and supported with substantially no frictional contact with the journal.

However, to reduce frictional contact between the shaft and journal during the initial starting process, before sufficient speed has been attained, and also to absorb the energy of impact such as frequently occurs between the shaft and journal when the shaft is rotating at normal speed, the structure of the present invention includes an important feature, here shown as a buffer 26.

The buffer 26 is illustrated in FIGURE 2 as including a hollow cylindrical sleeve 27 having an interior bore 28 of slightly greater diameter than the diameter of the shaft 16, and having an outer diameter slightly less than the diameter of bore 18 of the bearing block 14. Thus the sleeve 27 is adapted to fit loosely between the shaft 16 and block 14, and the space between the sleeve and block is filled with a yieldable material 29 such as grease, which supports the sleeve 27 in spaced relationship with respect to the bore 18, particularly at the lower side of the sleeve where the weight of the sleeve and shaft is borne. The sleeve also has a flange 31 extending between the wall 24 of the bearing block and the flange 21 of the shaft, and the space between the flange 31 and wall 24 is also filled with the material 29, to provide a yieldable thrust cushion for restraining axial movement of the shaft. The flange 31 is shown connected to the sleeve 27 by a coupling 30 which permits angular rotation to reduce alignment requirements. In some cases, it may be desirable to let sleeve 27 and flange 31 be completely separate. A similar flexible coupling can be provided between the shaft 16 and flange 21, but is not shown. A cover plate 32 is mounted as by means of fasteners 33 to cover the recess 19, the plate having a central opening 34 through which the shaft 16 may be extended.

For the sake of clarity, the thickness of sleeve 27, and the spacings between the sleeve, bearing block, shaft 16, flange 31 and flange 21, are greatly exaggerated.

The apparatus is shown in FIGURE 2 in its normal operating condition with the shaft 16 rotating and the shaft supported in spaced relationship to the sleeve 27 and its flange 31 as by an air cushion not manifest in the drawing. During this rotation of the shaft 16, the sleeve 27 is not rotating because of a characteristic for which the grease was chosen. Grease is one of the substances sometimes referred to as "Bingham plastics" (but not limited to this term), which when subject to a shearing stress lower in value than a characteristic threshold stress, behaves as a solid and does not flow, but when subjected to a shearing stress greater than the threshold, flows in the manner of a fluid. Thus, in FIGURE 2, the rotational shearing stress in the grease, induced by the fluid coupling of the air between the shaft and sleeve, is less than the threshold shear stress of the grease, and the sleeve does not rotate.

Likewise, the sleeve 27 does not sink through the grease to the subtending portion of the bore 18. The parameters of the bearing of the present invention are selected so that the shearing stress to which the grease is subjected by the ordinary weight of the sleeve, the shaft, and all that is supported on the shaft, is less than the characteristic threshold shearing stress of the grease. Consequently, under ordinary conditions the grease 29 behaves as a solid in the sense that it supports the weight of the shaft without collapsing and thus maintains a space between the sleeve and bearing block all the way around. When, however, the shaft 16 is suddenly subjected to lateral forces or begins to whirl the sleeve at certain frequencies (the same as the rotational speed or less) so as to move away from its normal rotational axis, and to strike the sleeve 27 with an impact, the shearing stress applied to the grease temporarily exceeds the threshold value, and the grease flows in such a way as to permit the sleeve to move toward the bearing block. Thus the energy of such whirl or impact is absorbed in the movement of the sleeve and of the various portions of the grease, and a catastrophic failure of the bearing is avoided. The thrust bearing portion of the apparatus, comprising the grease, the flange 31 and the flange element 21, likewise cushions the bearing under impact forces applied axially to the shaft 16. It is noted also that the sleeve may rotate under such impacts, with the grease flowing in a circumferential direction much in the same manner as in the starting operation of the bearing described below.

When the shaft is motionless, it ordinarily rests upon the subtending portion of the sleeve 27, as shown in FIGURE 3, while the sleeve is supported in spaced relation to the bearing block 17 as by means of the grease 29. When rotational forces are applied to the shaft, the shaft begins to move when the threshold shearing stress value of the grease is exceeded, and in such a way that it drives the sleeve 27 in rotation as by frictional engagement therewith. At first there is substantially no slippage between the shaft and the sleeve, and all the slippage takes place in the grease as between the sleeve and bearing block 17. While there is circumferential slippage in the grease, nevertheless the load on the grease in a radial direction is insufficient to exceed the threshold value, and the sleeve sinks only a relatively small amount, there still being sufficient spacing between the sleeve and bearing block to provide the play of the sleeve that is needed to absorb radial impact. When, however, the rotational speeds of the shaft and sleeve are sufficiently great, an air film is built up beneath the shaft and above the sleeve so that the shaft is supported entirely on air. At this point the shearing stresses drop drastically between shaft and sleeve, and therefore between sleeve and bearing block, so that the sleeve slows in rotation and eventually stops.

An analogous effect takes place in the thrust bearing portion of the apparatus, particularly if the motor is mounted with the shaft 16 vertical, or if before starting the shaft 16 is at rest with one of its flange elements 21 in engagement with one of its sleeve flanges 31. It will be noted, as illustrated in FIGURE 1, that the flange elements 21 and 31 of the bearing 13 are arranged in mirror image relation to the flange elements 21 and 31 of the bearing 14, so as to restrain the shaft 16 from substantial axial movement in either direction.

The thrust bearing portion of the device may also be constructed to provide suitable entrainment of the air and grease in any of a number of shapes well known in the art, one of them being illustrated in FIGURES 4 and 5. For example, the flange element 31 may be provided with a number of radial ridges 36, a plateaux 37, and pockets 38 on both sides of the flange 31. When the flange 31 is coupled to the sleeve 27 as shown (either rigidly or through the flexible coupling 30), the flange assists in maintaining correct alignment of the shaft and sleeve.

Considering that the tangential motion of any portion of the flange element 31 may be thought of as instantaneous linear motion, then FIGURE 5 also illustrates a fluid bearing constructed in accordance with the invention for minimizing friction between a pair of elements having relative motion in a straight line. In this figure the motion of the driving member or element 21 is illustrated by the arrow and the symbol "$u$," while transverse motion of the member, due to shock or load impact is illustrated by the pair of arrows and symbol "$w$." The normal force action on the bearing due to its ordinary gravitational or other load is illustrated by the pair of oppositely directed arrows and symbols "$F$". The same symbols are illustrated in FIGURE 3 with respect to the rotational portion of the bearing.

As an important feature of the invention, the buffer means 26 has as one of its primary characteristics a quality of radial yieldability. This yieldability has been described in relation to the above structure as being a type of fluid yieldability, but it may also be elastic or resilient in the sense that various portions of the buffer may not permanently change positions with respect to one another, but only temporarily, with return to their original relative positions after stress is removed. For example the substance 29, which was described above as a grease, may alternatively or in combination be replaced by a resilient element 30 (FIGURE 1) made for example of a substance such as felt or rubber; and this substance may be used with any fluid (e.g., a gas or a liquid such as oil) between the sleeve and shaft. Such substances will equally well protect the bearing against transverse shock, and may in addition provide slippage between the sleeve 27 and the bearing block 17 that is sufficiently free to permit the shaft 16 to drive the sleeve by frictional engagement during the starting period and so eliminate wear of the shaft. Under some circumstances, the sleeve 27 itself may be dispensed with, or may be made of the resilient substance, so that the entire buffer consists merely of a hollow cylinder of felt or rubber, which still satisfies the requirement that the buffer be yieldable in a radial direction even though there is frictional slipping engagement between shaft and buffer, or between buffer and journal, during the starting period. In addition, the felt or a porous rubber may be used as the buffer and impregnated with oil or another lubricant to reduce the effect of friction between the shaft and buffer and/or buffer and journal. Another arrangement consists of a felt buffer element impregnated with grease, used with or without the sleeve 27. It is equally feasible to use a gas or other fluid between the sleeve and bearing block when felt, rubber or grease is used between the sleeve and shaft, or alternatively when a felt or rubber buffer is constructed to closely surround the shaft itself, while a space is provided between the buffer and bearing block for a liquid or air bearing. In other words the elements above described in the invention may be reversed in their order from the axis of the shaft radially outward, so that the buffer engages (and may even be affixed to) the shaft rather than the bearing block, and so that the air or fluid portion of the bearing is situated between the buffer and the bearing block.

In operation, the shaft begins from a position of rest illustrated in FIGURE 3, in which the shaft is resting directly upon the subtending portion of the buffer sleeve 27, while the sleeve is supported around its entire periphery by the grease 29. As the shaft begins to rotate, it does not slip with respect to the sleeve 27, but drives the sleeve in the same rotational direction, with slippage taking place in the layer of grease 29. When the shaft and sleeve are rotating rapidly, an air film is built up between shaft and sleeve, so that the shaft is supported as illustrated in FIGURE 2, while the sleeve slows down and ordinarily comes to a stop, still supported on a layer of grease. The flanges 21 and 31 also build up an air film between themselves, while the flange 31 is free to slip with respect to the bearing block 17 because of the layer of grease 29 interposed. Thus the shaft is supported against rotational friction and thrust friction in at least one direction, and by means of the orientations of the bearings in mirror-image relation, thrust support in two directions is provided. During the normal operation of the machine, however, if a transverse load is applied to the shaft, or if the shaft begins to whirl so as to encounter the sleeve 27 of flange 31 with an impact, the grease yields in such a way as to permit transverse, axial and rotational movement of the sleeve and its flange to absorb the energy of the impact, to damp the undesired movement of the shaft, and to prevent failure of the bearing.

It will be understood that the structure above described may be varied in many ways known in the art, without departing from the spirit and scope of the invention. For example, either the material 29 or the fluid bearing material may be externally pressurized and may be chosen from a wide range of materials having the characteristics of fluids, including lubricants of all classes, and even finely divided particulate matter. Also, the journal block 17, the shaft 16, and the sleeve element 27, 31 may be provided as desired with fluid-supply channels, or may be formed of porous material for feeding and withdrawal of the fluids.

Thus there has been described a bearing including a buffer mounted between a shaft and a journal block, the buffer being yieldable in a radial direction to absorb the energy of radial impact of the shaft, and the buffer is also rotatable by the shaft during starting so that the shaft undergoes no frictional wear. In one form the buffer is a hollow cylindrical sleeve loosely fitted between the shaft and journal and concentric with the journal, the space between the sleeve and journal being filled with grease. On starting, the shaft, in frictional contact with the sleeve, causes the sleeve to rotate. Shear occurs within the grease but substantially no slippage occurs between the shaft and sleeve. When the rational velocity is great enough to cause air to be entrapped between the shaft and sleeve, the shaft becomes supported by an air cushion and the sleeve stops rotating. The grease then functions as a radially yieldable support for the sleeve, holding it in spaced relation to the journal. If the shaft suddenly engages the sleeve with an impact, the energy of collision is absorbed in the grease and no damage results. An analogous arrangement is adapted to perform as a thrust bearing.

What is claimed is:
1. Apparatus providing a low-friction bearing between a pair of relatively movable elements, comprising:
   a buffer slidably disposed between and engaging one of said relatively movable elements, said buffer being yieldable with respect to said one element in a direction normal to the plane of relative movement of said elements; and
   a fluid disposed between said buffer and the other of said elements, said fluid and buffer being of different material composition;
   The dimensions and materials of said apparatus being chosen to produce relative motion between said buffer and both of said elements during starting operation, and between said buffer and only one of said elements when said elements have a predetermined operating velocity of relative movement.

2. Apparatus providing a low-friction bearing between a pair of relatively movable elements, comprising:
   a buffer slidably disposed between and engaging one of said relatively movable elements, said buffer being yieldable with respect to said one element in a direction normal to the plane of relative movement of said elements, and also in the direction of said relative movement; and
   a fluid disposed between said buffer and the other of said elements, said fluid and buffer being of different material composition;
   the dimensions and materials of said apparatus being chosen to produce relative motion between said buffer and both of said elements during starting operation, and between said buffer and only one of said elements when said elements have a predetermined operating velocity of relative movement.

3. Apparatus providing a low-friction bearing between a pair of relatively movable elements, comprising:
   a buffer slidably disposed between and engaging one of said relatively movable elements, said buffer being yieldable with respect to said one element in a direction normal to the plane of relative movement of said elements, said buffer also being movable with respect to said elements in the direction of said relative movement of said elements; and
   a fluid disposed between said buffer and the other of said elements, said fluid and said buffer being of different material composition;
   the dimensions and materials of said apparatus being chosen to produce relative motion between said buffer and both of said elements during starting operation, and between said buffer and only one of said elements when said elements have a predetermined operating velocity of relative movement.

4. Apparatus providing a low-friction bearing between a shaft element and a bearing element, comprising:
   a buffer slidably disposed between said shaft element and said journal element and engaging one of said elements, said buffer being yieldable with respect to said one element in a radial direction with respect to said elements, said buffer also being rotatable with respect to said elements about the axes of said elements; and
   a fluid disposed between said buffer and the other of said elements, said fluid and said buffer being of different material composition;
   the dimensions and materials of said apparatus being chosen to produce relative motion between said buffer and both of said elements during starting operation, and between said buffer and only one of said elements when said elements have a predetermined operating velocity of relative movement.

5. Apparatus providing a low-friction bearing between a rotating shaft and a bearing block, comprising:
   a buffer formed at least in part as a hollow cylindrical ring of resilient material disposed around said shaft and between said shaft and said bearing block, peripherally slidably engaging said bearing block and radially spaced from said shaft; and
   a fluid disposed between said buffer and said shaft;
   the dimensions and materials of said apparatus being chosen to produce relative motion between said buffer and both of said elements during starting operation, and between said buffer and only one of said elements when said elements have a predetermined operating velocity of relative movement.

6. Apparatus providing a low-friction bearing between a rotating shaft and a bearing block, comprising:
   a buffer formed at least in part as a hollow cylindrical ring of felt material disposed around said shaft and between said shaft and said bearing block, peripherally slidably engaging said bearing block and radially spaced from said shaft; and
   a fluid disposed between said buffer and said shaft.

7. Apparatus providing a low-friction bearing between a rotating shaft and a bearing block, comprising:
   a buffer formed at least in part as a hollow cylindrical ring of oil-impregnated felt material disposed around said shaft and between said shaft and said bearing block, peripherally slidably engaging said bearing block and radially spaced from said shaft; and
   a fluid alone disposed between said buffer and said shaft.

8. Apparatus providing a low-friction bearing between a rotating shaft and a bearing block, comprising:
   a buffer including a hollow cylindrical ring of solid material disposed around said shaft and between said shaft and said bearing block and radially spaced at all points from both said shaft and said bearing block, the space between said ring and said bearing block being filled with a material having a threshold shearing stress below which said material is effectively resistant to flow and above which said material flows as a fluid; and
   a fluid other than said material disposed between said buffer and said shaft.

9. Apparatus providing a low-friction bearing between a rotating shaft and a bearing block, comprising:
   a buffer including a hollow cylindrical ring of solid material disposed around said shaft and between said shaft and said bearing block and radially spaced from both said shaft and said bearing block, the space between said ring and said bearing block being filled with a grease; and
   a fluid other than said grease disposed between said buffer and said shaft.

10. Apparatus providing a low-friction bearing between a rotating shaft and a bearing block, comprising:
    a buffer formed as a hollow cylindrical ring of solid material disposed around said shaft and between said shaft and said bearing block and radially spaced from both said shaft and said bearing block, the space between said ring and said bearing block being filled with a felt material and slidably engaging said bearing block; and
    a fluid disposed between said buffer and said shaft.

11. Apparatus providing a low-friction bearing between a shaft and a bearing block, comprising:
    a buffer formed as a hollow cylindrical ring of solid material disposed around said shaft and between said shaft and said bearing block and radially spaced from both said shaft and said bearing block, the space between said ring and said bearing block being filled with an oil-impregnated felt material and slidably engaging said bearing block; and
    a gas disposed between said buffer and said shaft.

12. Apparatus providing a low-friction bearing between a shaft and a bearing block, comprising:
    a buffer formed as a hollow cylindrical ring of solid material disposed around said shaft and between said shaft and said bearing block and radially spaced from both said shaft and said bearing block, the space between said ring and said bearing block being filled with a grease-impregnated felt material and slidably engaging said bearing block; and
    a fluid disposed between said buffer and said shaft.

13. Apparatus providing a low-friction thrust bearing between a shaft element and a thrust bearing element axially confronting a portion of said shaft element, comprising:
    a buffer disposed for unlimited rotational displacement between said bearing element and said portion of said shaft element, said buffer being yieldable in an axial direction of said shaft element; and
    a fluid disposed between said buffer and one of said elements, said buffer and said fluid being of different material composition.

14. Apparatus providing a low-friction thrust bearing between a shaft and a thrust bearing element, comprising:
    a disc element mounted concentrically on said shaft and confronting a portion of said thrust bearing element;
    a buffer disposed for unlimited rotational displacement between said bearing element and said disc element, said buffer being yieldable in an axial direction of said shaft; and
    a fluid disposed between said buffer and one of said elements, said buffer and said fluid being of different material composition.

15. Apparatus providing a low-friction thrust bearing between a shaft and a thrust bearing element, comprising:
    a disc mounted concentrically on said shaft and confronting a portion of said thrust bearing element;
    a buffer formed as a flat ring of solid matter disposed around said shaft and for unlimited rotational displacement between said disc and said bearing element and axially spaced from both said disc and said bearing element, the space between said ring and said bearing element being filled with a material having a threshold shearing stress below which said material is effectively resistant to flow and above which said material flows as a fluid; and
    a fluid other than said material disposed between said buffer and said disc.

16. Apparatus providing a low-friction bearing between a rotating shaft and a bearing block, comprising:
    a disc mounted concentrically on said shaft and confronting a portion of said bearing block;
    a buffer formed as a hollow cylindrical sleeve terminating at one end in a radially extending flange, said sleeve being disposed around said shaft and for unlimited rotational displacement between said shaft and bearing block with said flange between said bearing block and said disc, said sleeve and flange being spaced at all points from said bearing block and from said shaft and disc, the space between said bearing block and said sleeve and flange being filled with a material having a threshold shearing stress below which said material is effectively resistant to flow and above which said material flows as a fluid; and
    a fluid other than said material disposed in the space between said buffer and said shaft and disc.

17. Apparatus as described in claim 16, wherein at least one of the combinations of sleeve-flange and shaft-disc is coupled by means of a flexible coupling to permit variations in the axial alignment thereof.

18. Apparatus providing a low-friction bearing between a rotating shaft and a pair of bearing blocks, comprising:
    a pair of spaced discs each mounted concentrically on said shaft and each confronting a portion of a respective one of said bearing blocks, said portions of said bearing blocks in turn confronting one another;
    a pair of buffers each formed as a hollow cylindrical sleeve terminating at one end in a radially extending flange, each of said sleeves being disposed around said shaft and for unlimited rotational displacement between said shaft and a respective one of said bearing blocks with said respective flange between said respective bearing block and a respective one of said discs, said sleeves and flanges being spaced at all points from said bearing blocks and from said shaft and discs, the space between each of said bearing blocks and said respective sleeve and flange being filled with a material having a threshold shearing stress below which said material is effectively resistant to flow and above which said material flows as a fluid; and a fluid other than said material disposed in the space between each of said buffers and the adjacent portions of said shaft and discs.

References Cited by the Examiner

UNITED STATES PATENTS

| | | | |
|---|---|---|---|
| 1,323,636 | 12/19 | Garman | 308—72 |
| 1,670,915 | 5/28 | Volare | 308—238 |
| 1,677,171 | 7/28 | Casey et al. | |
| 1,995,548 | 3/35 | Mermigis. | |
| 2,663,599 | 12/53 | Mackay | 308—238 |
| 2,824,773 | 2/58 | Bontempi | 308—26 |
| 2,872,254 | 2/59 | McNaughton | 308—35 |
| 3,012,827 | 12/61 | Goetz | 308—35 |
| 3,034,837 | 5/62 | Barker. | |
| 3,043,636 | 7/62 | MacInnes | 308—121 |
| 3,056,634 | 10/62 | Wollenweber | 308—121 |

ROBERT C. RIORDON, *Primary Examiner.*

FRANK SUSKO, *Examiner.*